Jan. 8, 1935.  E. G. RAGATZ  1,987,267
METHOD FOR THE ABSORPTION OF GASES
Filed Oct. 27, 1931
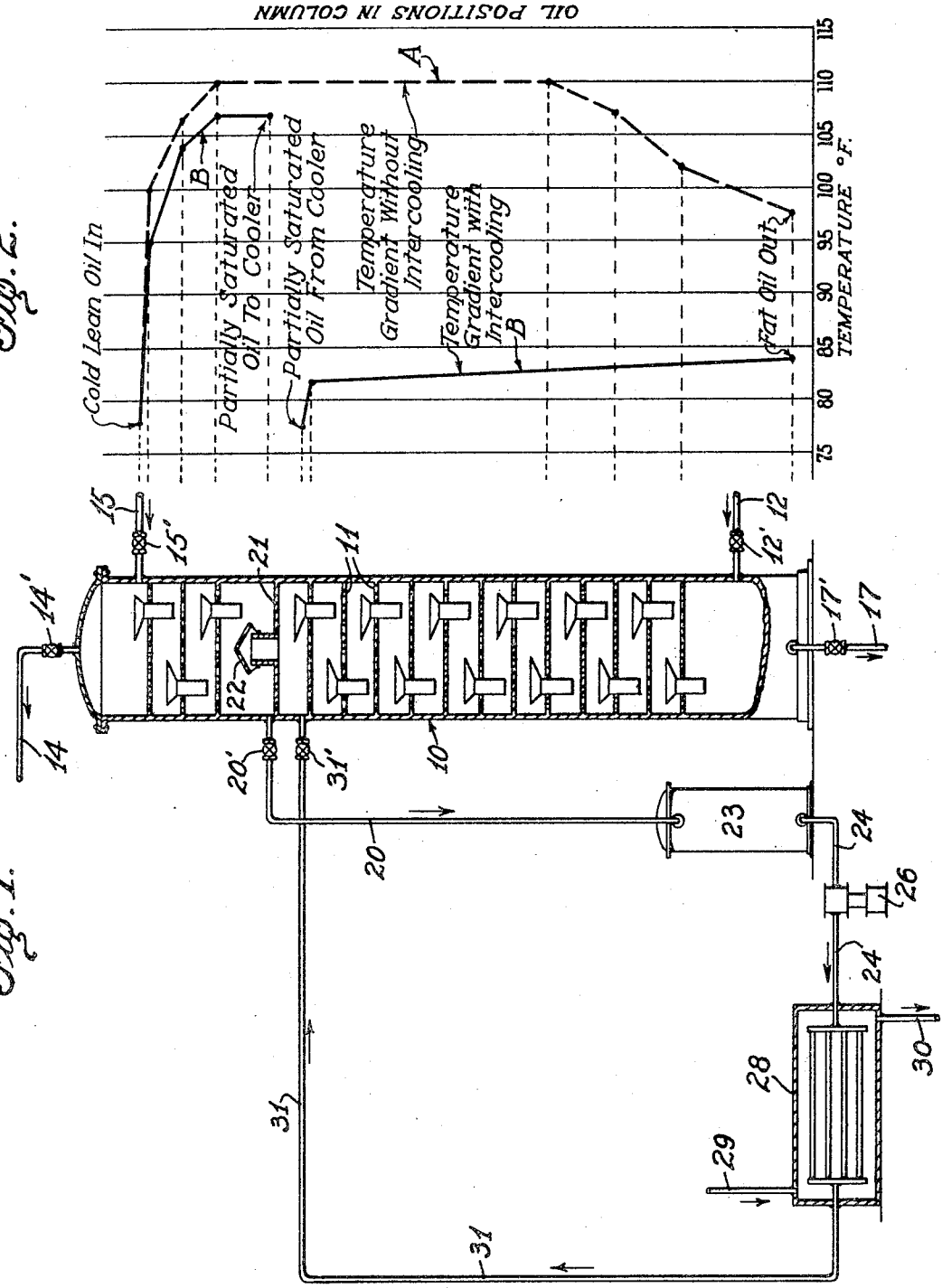
INVENTOR.
Edward G. Ragatz
BY
Philip Subkow
ATTORNEY.

Patented Jan. 8, 1935

1,987,267

UNITED STATES PATENT OFFICE 1,987,267

METHOD FOR THE ABSORPTION OF GASES

Edward G. Ragatz, Los Angeles, Calif., assignor to Union Oil Company of California, Los Angeles, Calif., a corporation of California Application October 27, 1931, Serial No. 571,448

12 Claims. (Cl. 183—114.6)

The present invention relates to a process for separating condensable vapors from a mixture of gases and is more particularly directed to a process for extracting gasoline constituents from casinghead or natural gas by means of an absorption menstruum.

It is well known that large quantities of gasoline can be recovered from natural or casinghead gases by various methods, the most prevalent constituting the so-called absorption method. These casinghead gases are composed chiefly of saturated hydrocarbons of the paraffin series ranging from methane to approximately heptane of which approximately 95 mol. percent constitutes methane, ethane and propane. These may be termed the fixed gases. The remaining 5 mol. percent is composed of isobutane, normal butane, pentanes, hexanes and heptanes and constitutes the bulk of the constituents recoverable as natural gasoline. While these percentages vary with the source of the gas their relative proportions are approximately as given. In some natural gases, the molal concentration of the heavier condensable fractions will vary from 2.5% to 20%.

In the absorption method for recovering gasoline fractions, a lean absorption oil, i. e., one freed from light fractions, is circulated countercurrent to the natural gas in a column provided with a plurality of contacting or bubble trays. The wet gas, i. e., the gas containing the condensable gasoline constituents is stripped of these when coming in intimate contact with the lean absorption oil, the gasoline constituents being retained in this oil to form a saturated absorption oil. The dry or "stripped" gas is discharged from the top of the absorption tower. The saturated oil, commonly called "fat" oil is subsequently distilled to relieve it of its absorbed constituents, and the resulting vapors are condensed to produce raw casinghead gasoline which may subsequently be stabilized to remove the undesirable volatile constituents therefrom such as methane, ethane and propane which render the gasoline "wild". The stripped or reclaimed oil is then recirculated for further absorption of gases.

In general, the efficiency of the absorption process is dependent upon the character of absorption oil employed, the amount thereof circulated with respect to the volume of gases, or what is commonly termed as the oil gas ratio, and the temperature of the absorption oil during absorption. For good operation, a medium gravity oil should be used having a narrow boiling range, i. e., one devoid of light fractions of the gasoline range and also free of heavy fractions. An oil having a boiling range of approximately 350 to 550° F. on an Engler distillation test has proved to be efficient in a number of operations. The higher the oil gas ratio, i. e., the greater the amount of absorption oil circulated throughout the column with respect to the amount of gas, the greater will be the amount of absorbable constituents separated from the wet gas. The temperature of the absorption oil within the column also plays an important part in the efficiency of absorption, since a given quantity of absorption oil at relatively low temperatures will more readily absorb a greater amount of light fractions from the wet gas than an oil at higher temperatures.

As is well known, the absorption phenomenon is an exothermic reaction accompanied by an increase in temperature of the absorption menstruum. This increase in temperature is a detriment to efficient and economical operation because in order to absorb all of the desired constituents in the gases, a relatively large quantity of absorption oil must be circulated through the absorber. This increase in oil circulation rates or what is commonly known as the oil gas ratio, results in a material increase in distillation equipment for recovering the absorbed gasoline constituents. Thus, with increased circulation rates, stills must be provided, having a greater capacity for the oil used. Consequently, larger pumps and larger tanks, etc., must be provided to handle the oil. Most important of all, high oil circulation rates at the higher temperatures result in the absorption of large quantities of undesirable fixed gases. These gases must also be handled in the distillation of the fat oil.

In recent years attempts have been made to decrease the oil gas ratio by maintaining lower temperatures in the absorption column. These attempts have consisted largely in providing intercoolers such as tubes or coils intermediate the lower trays of the absorption column and circulating a cooling fluid therethrough to absorb the heat of reaction due to the absorption. This has resulted in somewhat reduced oil gas ratios but these intercooling sections, when built within the column, are only partially effective due to the fact that it is uneconomical if not impossible to install sufficient surface between the individual trays to effect the maximum cooling of the absorption oil in its passage through the column. Furthermore, such types of absorption columns have been provided with intercoolers close to the bottom of the column so that the maximum cooling takes place in the bottom of the column, i. e., after the absorption oil saturated with gasoline constituents has traveled throughout the length of the column. This was due to the fact that operators have stressed the fact that the fat oil or oil saturated with gasoline constituents should be as cold as possible when leaving the column. Whereas it is my observation, as will be pointed out hereafter in greater detail, to stress maximum cooling close to the upper extremity of the column, i. e., adjacent to the inlet of the lean cold absorption oil.

I have observed from an analysis of high pressure absorption performance that the maximum temperature rise of the absorption menstruum due to the exothermic reaction occurs in the upper two or three trays of the column. For example, in the case of a high pressure absorber operated at 450 pounds per square inch, 80% of the total sensible heat increase in the absorber can be accounted for in the temperature rise of the absorption oil through the top three trays. This sudden temperature increase in the upper section of the column is due to the almost immediate saturation of the cold lean absorption oil with the lighter constituents of the relatively lean gases passing through the upper section of the column such as methane, ethane, propane and isobutane, which, for the purpose of this specification, are sufficiently accurately described as fixed gases, i. e., are in the gaseous state at ordinary atmospheric temperatures and pressures. The fractions composed of butanes, pentanes, hexanes and heavier hydrocarbons are the condensable gasoline fractions going to make up the gasoline to be recovered from the natural gas. I have noted that the quantity of these lightest gases absorbed in the top three trays of the high pressure absorption column amounts to approximately 25 mol. percent of the absorption oil. Consequently, the heat liberated by the absorption of these lighter constituents is responsible for the relatively high temperatures occurring in the upper portion of the column and thus for increased oil gas ratios.

I have therefore discovered that if the absorption oil, subsequent to its being heated to approximately its maximum temperature by saturation with the partially denuded gases, i. e., the fixed gases, is cooled to approximately its original temperature before being permitted to contact further quantities of gases, more efficient absorption may be obtained with a consequent decrease in the oil gas ratio. Thus, with a single intercooling stage as shown hereafter, the oil circulating rates have been materially reduced to the extent of 30% in the case of an absorber operated at 450 pounds per square inch.

In order to obtain the best results I have provided an intercooler positioned outside of the column proper. The intercooler is connected with the column in such manner that the hot partially saturated absorption oil may be removed from the second or third tray, pumped through the intercooler, and subsequently re-introduced into the column at a tray below the tray from which the partially saturated oil was removed, preferably the next tray below. With an intercooler layout positioned outside of the column proper, the intercooler may be of sufficiently large capacity to cool the partially saturated oil to a minimum temperature. The partially saturated oil is thus reduced to such temperature as to more readily absorb further quantities of gases in its travel through the remaining lower trays. The removal of the oil from near the top of the column and its subsequent thorough cooling in a single operation constitutes a material improvement over prior methods of intercooling in that the intercooling equipment is both considerably simplified and thus materially reduced in cost, while the maximum improvement is obtained in absorption efficiency. With the low temperatures of absorption oil that are permissible by the present invention, greatly reduced oil circulation rates are presented over prior methods of absorption.

It is consequently an important object of my invention to materially reduce absorption oil circulation rates, i. e., to reduce the oil gas ratio in an absorption column.

It is another object of my invention to provide a process for the separation of gases by means of absorption oil wherein the absorption oil is maintained in a relatively cool state throughout a large portion of the column.

A further object resides in providing an intercooler of sufficiently large capacity to thoroughly cool the partially saturated absorption oil after it has attained a high temperature due to the absorption phenomenon.

It is a further object of my invention to cool absorption oil in a natural gas absorber by cooling the oil after it has reached its approximate maximum temperature as a result of absorption of the lighter constituents of the natural gas and before its contact with the natural gas to absorb the heavier constituents of the natural gas.

As may be observed from the above, the invention comprehends a process for the separation of condensable gases from hydrocarbon gases which comprises the features of cooling the absorption oil after it has attained a high temperature due to absorption of the gases and prior to absorption of further quantities of gases. The invention also includes the features of removing the partially saturated oil from the absorption column, then cooling it to a temperature approximating that of the original oil before being heated by contact with gases, and subsequently returning it to the column to continue absorption of further quantities of gases.

In a more specific statement of the present invention, it comprises a process for recovering gasoline constituents from hydrocarbon gases such as natural gas by contacting the same with a cold lean absorption oil in the upper trays of an absorption column and subsequently withdrawing the thus partially saturated absorption oil from the column after its attaining a high temperature as a result of the exothermic reaction with the gases, i. e., their absorption, then cooling the removed oil to a temperature approximating that of the cold lean oil introduced into the column and returning the thus cooled oil to the column at a point adjacent that of its withdrawal so as to permit absorption of further quantities of gases. The invention also includes the combination of the above features with the steps of separating, condensing and stabilizing the gases absorbed in the oil. It also includes operation of the above absorption process under high pressures of the order of 300–600 pounds per square inch and upwards and also under lower pressures.

Further objects and features of the present invention will be apparent from the following description taken from the drawing wherein Fig. 1 is a diagrammatic drawing of the apparatus necessary to carry out the present invention, and Fig. 2 represents curves showing the temperature gradient of absorption oil throughout the column.

Referring to Fig. 1, 10 is an absorption column provided with a plurality of conventional perforated or bubble trays 11. The absorption column is also provided with an inlet 12 controlled by valve 12' adjacent the bottom thereof for the introduction of a wet gas containing gasoline fractions to be recovered. An outlet 14, controlled by valve 14', at the top of the column is for withdrawing denuded or stripped gases. Line 15, controlled by valve 15', positioned adjacent the upper extremity of the column 10 permits the introduction of cold lean absorption oil into the column while line 17, controlled by valve 17', positioned close to the bottom of the column, permits the withdrawal of fat absorption oil, i. e., oil saturated with gasoline constituents from the hydrocarbon gases. This fat oil may then be conducted to a stripping still or column (not shown) for the purpose of recovering the gasoline constituents and to other treating units known by those familiar with absorption processes.

The column 10 is also provided with an external intercooler unit consisting of line 20, controlled by valve 20', leading from the column at bleeder tray 21 which is constructed in a manner as to prevent flow of oil to the trays below and is provided with a cap 22 to permit entrance of gases from the tray below. The purpose of line 20 is to pass partially saturated oil to a receiving tank 23 from which the oil passes into line 24 and is pumped by pump 26 through an absorption oil cooler 28. This unit may constitute any conventional type of heat exchanger wherein cooling fluid introduced via line 29 and removed via line 30 is circulated in heat exchange relation with the partially saturated and heated oil. Line 31, controlled by valve 31', permits the return of the recooled partially saturated absorption oil to the column at a point below the tray from which the oil was withdrawn.

In the operation of the present invention, a wet gas from an oil well or from any other source which has been cooled by means of a cooling tower to a temperature of 82° F. and at a pressure of approximately 420 pounds per square inch gauge is introduced into the bottom of the column via line 12 and is passed countercurrent to a lean absorption oil at a temperature of approximately 78° F. introduced into the column via line 15. Of course, the temperature of the incoming gases and lean absorption oil may vary depending upon atmospheric conditions and the temperature of the cooling medium for lowering the temperature, it being understood that the cooler the gases and absorption oil are, the more efficient the operation will be. For practical purposes, temperatures of gases and absorption oil between 70 and 85° F. have given satisfactory efficient operation. The gas coming into contact with the partially saturated oil, as will be explained hereafter, is relieved immediately of its heavier gasoline fractions comprising the pentanes and heavier hydrocarbons in the lower sections of the column and the thus partially stripped gas passes upwardly. On its way upward it is partially stripped of the condensable fractions intermediate the normally liquid pentanes, i. e., the butanes are absorbed. The stripped gas then comes into contact with fresh absorption oil in the upper three trays. The lean or dry, i. e., fixed gases pass continuously out of the column via line 14. These may be used at the still burners as fuel or may be sold as natural gas. In the upper three trays of the column, the temperature of the absorption oil is increased from 78° F. to approximately 103° F. and is partially saturated with light fixed gas constituents of the gas consisting chiefly of methane, ethane, propane and butane and amounting to approximately 25 mol. percent of the absorption oil. This oil is withdrawn from the column at the bleeder tray 21 and is passed via line 20 into the receiving tank 23. It is then pumped by pump 26 through the absorption oil cooler 28 wherein the heat of reaction due to the absorption phenomenon is removed, i. e., the oil is cooled to a temperature approximating the inlet temperature of the lean oil or approximately 78° F. The thus cooled partially saturated oil is returned to the column via line 31 to the tray below the bleeder tray 21. This oil is then permitted to pass countercurrent to the gases throughout the remainder of the column and is withdrawn therefrom at the bottom at a temperature of approximately 84° F. The oil thus saturated with gasoline fractions is passed via line 17 to any suitable distillation and stabilization units in order to produce a marketable stable gasoline.

Referring to Fig. 2, a better understanding of the invention will be obtained by comparison of the temperature gradients of absorbers operated without an intercooler layout and with intercooling. Curve A represents the temperature gradient of the absorption oil at various trays in the column without provision for intercooling. It will be observed from this curve that the temperature of the absorption oil at 78° F. is sharply increased to approximately 110° F. and this occurs in the upper three trays, i. e., immediately after the absorption oil has come into contact with the partially stripped gases from which substantially all of the heavier or normally condensable constituents have been separated in the lower sections of the column. The temperature of the absorption oil remains practically constant from this tray to approximately the twelfth tray from the top after which it is gradually cooled due to the cooler incoming rich gases. It is thus seen without intercooling that the absorption oil is immediately heated to a maximum temperature and remains at this maximum temperature for a considerable portion of the travel through the column so that it is impossible for the oil at such high temperature to absorb the desired quantities of intermediary fractions of the order of butane unless sufficient oil is circulated.

Curve B represents the temperature gradient through the absorber with intercooling such as by the present invention. An observation of this curve and a comparison with curve A will reveal that the maximum temperature will also be obtained immediately, i. e., in the upper three trays and this temperature is slightly lower than without intercooling. After the oil was removed, cooled to approximately the original temperature of the lean absorption oil or to 78° F. and returned to the column, it again became sharply heated, but not to as great extent as before, by absorption of further quantities of gases. The temperature increased to approximately 82° F. The temperature of the oil from this point to its withdrawal at the bottom of the column increased only a few degrees. If desired, an intercooler layout may be provided to return the oil to the original temperature of 78° F. after the second increase, i. e., after the fourth tray.

It will be observed in connection with the discussion of the above temperature gradients through the absorber, that the oil circulation rates were materially decreased in the case of intercooling the partially saturated oil from those without intercooling. However, the amount of oil circulated in either case was based on the same percentage recovery of the key fraction which, in the present case, was butane. As is well known, the key fraction may be defined as that intermediate fraction of the gas of which it is desired to absorb a definite part and discard the remainder. In some instances, it may be desired to absorb only enough of the key fraction to assure substantially complete absorption of the heavier and totally desirable fractions; in other cases, it may be desired to absorb more of the key fraction than is required for complete recovery of the heavier constituents. However, in all cases, it is definitely desired that a portion of the key fraction be discarded. In most instances, butane is the key fraction since most natural gasolines are sold on a percent butane basis. The key fraction and the percent thereof is readily calculable by analysis of the particular wet gas to be subjected to absorption as is well known by those skilled in the art.

Thus, with intercooling of partially saturated absorption oil, I have reduced the oil circulation rates by 30% in the case of a 450 pound per square inch absorber. As previously stated, decreased oil gas ratios result in more efficient operation, in eliminating the necessity for handling large quantities of absorption oil and in lower quantities of fixed gases unavoidably absorbed in the oil which must be handled at the stripping plant, the amount of fixed gases being increased due to increased oil circulation rates.

The above method has been described as being particularly adapted for recovering gasoline fractions from natural gas; however, it may also be applied to the separation of other gases with absorption menstruum which is heated due to exothermic reaction. The above disclosure is to be taken merely as illustrative of a preferred embodiment of my invention and is not to be considered limiting, since many variations thereof may be made within the scope of the following claims.

I claim:

1. A method of separating gases composed of light fixed gases and heavier condensable gases by absorption with an absorption menstruum which comprises passing said gases countercurrent to a cold absorption menstruum, first contacting said menstruum with the gases from which the major portion of the condensable fractions have been removed, and in said contact absorbing said light fixed gases in the absorption menstruum, thus sharply increasing the temperature of said absorption menstruum, cooling the absorption menstruum to approximately the temperature of the cold absorption menstruum prior to said sharp increase in temperature and contacting the cooled absorption menstruum with the said gases containing said condensable fractions, separating the absorption menstruum containing both said absorbed fixed gases and condensable fractions from said zone of countercurrent contact with said gases.

2. A method of separating gases composed of light fixed gases and heavier condensable gases by absorption with an absorption menstruum which comprises passing said gases countercurrent to a cold absorption menstruum, first contacting said menstruum with the gases from which the major portion of the condensable fractions have been removed and in said contact absorbing said light fixed gases in the absorption menstruum, generating in said absorption menstruum material amounts of heat as heat of absorption of said light fixed gases, cooling the absorption menstruum to approximately the temperature of the cold absorption menstruum prior to said generating of heat in said absorption menstruum and contacting the cooled absorption menstruum with the said gases containing said condensable fractions, separating the absorption menstruum containing both said absorbed fixed gases and condensable fractions from said zone of countercurrent contact with said gases.

3. A method of separating gasoline from natural gas which comprises first contacting said gas substantially freed of gasoline fractions with an absorption oil to absorb methane, ethane, propane and butane in the absorption oil, thus sharply increasing the temperature of said absorption oil, cooling the oil to substantially its original temperature and contacting the cooled oil with the natural gas containing the gasoline fractions to absorb in oil both said methane, ethane, propane and butane and said gasoline fractions.

4. A method of separating gases composed of light fixed gases and heavier condensable gases by absorption with an absorption menstruum which comprises passing said gases at a pressure of approximately 450 pounds per square inch countercurrent to an absorption menstruum at approximately 75° F., first contacting said menstruum with the gases from which the major portion of the condensable fractions have been removed, and in said contact absorbing said light fixed gases in the absorption menstruum, thus sharply increasing the temperature of said absorption menstruum to approximately 100° F., cooling the absorption menstruum to approximately 75° F. and contacting the cooled absorption menstruum with the said gases containing said condensable fractions and separating the absorption menstruum containing both said absorbed fixed gases and condensable fractions from said zone of countercurrent contact with said gases.

5. A method of separating gasoline from natural gas which comprises first contacting said gas substantially freed of gasoline fractions with an absorption oil to absorb methane, ethane, propane and butane to the extent of approximately 25 mol. percent of said absorption oil and thus sharply increasing the temperature of said absorption oil, cooling the oil to substantially its original temperature and contacting the cooled oil with the natural gas containing the gasoline fractions to absorb in oil both said methane, ethane, propane and butane and said gasoline fractions.

6. A process for separating gases composed of light fixed gases and heavier condensable gases by absorption with an absorption menstruum which comprises flowing an absorption menstruum in contact with a stream of said gases to absorb a portion of the light fixed gases thus sharply increasing the temperature of said absorption menstruum, cooling said menstruum containing said absorbed gases in a zone extraneous of said stream of gases and returning said cooled menstruum containing said absorbed gases to said stream to absorb heavier condensable gases.

7. A method of separating gasoline from natural gas which comprises flowing an absorption menstruum countercurrent to a stream of natural gas, first contacting said gas substantially freed of gasoline fractions with said absorption menstruum to absorb methane, ethane, propane and butane, thus sharply increasing the temperature of said absorption menstruum, removing said menstruum containing said gases from said stream of contact, cooling said menstruum containing said gases in a zone extraneous of said stream and contacting said cooled menstruum with natural gas containing the gasoline fractions to absorb in said menstruum both said methane, ethane, propane and butane and said gasoline fractions.

8. A method of separating gases composed of light fixed gases and heavier condensable gases by absorption with an absorption menstruum which comprises passing said gases countercurrent to a cold absorption menstruum, absorbing from said gases those light fixed gases which cause a sharp increase in temperature of the absorption menstruum until upon further absorption no further increase in temperature of the menstruum will be observed subsequently cooling the absorption menstruum and contacting the cooled absorption menstruum with said gases containing said condensable fractions, separating the absorption menstruum containing both said absorbed fixed gases and condensable fractions from said zone of countercurrent contact with said gases.

9. A process according to claim 8 in which the absorption menstruum after the heat absorption is cooled to approximately the temperature of the cold absorption menstruum prior to the sharp increase in temperature due to the absorption of the light fixed gases.

10. A method of separating gases composed of light fixed gases and heavier condensable gases by absorption in an absorption menstruum which comprises passing said gases countercurrent to a cold absorption menstruum, absorbing from said gases those light fixed gases which cause a sharp increase in temperature of the absorption menstruum until upon further absorption no further increase in temperature of the menstruum will be observed, subsequently cooling the absorption menstruum to approximately the temperature of the cold absorption menstruum prior to said sharp increase in temperature and continuing the absorption of light fixed gases and heavier condensable gases in the absorption menstruum without any substantial increase in the temperature thereof.

11. A method of separating gases composed of light fixed gases and heavier condensable gases by absorption with an absorption menstruum which comprises passing said gases countercurrent to a cold absorption menstruum, first contacting said menstruum with the gases from which the major portion of the condensable fractions have been removed, and in said contact absorbing said light fixed gases in the absorption menstruum, thus sharply increasing the temperature of said absorption menstruum, cooling the absorption menstruum in the absence of any substantial amounts of unabsorbed condensable gases to approximately the temperature of the cold absorption menstruum prior to said sharp increase in temperature and contacting the cooled absorption menstruum with the said gases containing said condensable fractions, separating the absorption menstruum containing both said absorbed fixed gases and condensable fractions from said zone of countercurrent contact with said gases.

12. A method of separating gases composed of light fixed gases and heavier condensable gases by absorption with an absorption menstruum which comprises passing said gases countercurrent to a cold absorption menstruum, first contacting said menstruum with the gases from which the major portion of the condensable fractions have been removed and in said contact absorbing said light fixed gases in the absorption menstruum, generating in said absorption menstruum material amounts of heat as heat of absorption of said light fixed gases, cooling the absorption menstruum in the absence of any substantial amounts of unabsorbed condensable gases to approximately the temperature of the cold absorption menstruum prior to said sharp increase in temperature and contacting the cooled absorption menstruum with the said gases containing said condensable fractions, separating the absorption menstruum containing both said absorbed fixed gases and condensable fractions from said zone of countercurrent contact with said gases.

EDWARD G. RAGATZ.